Feb. 3, 1942.　　　　C. E. G. BAILEY　　　　2,271,534
RADIO RECEIVER FOR DIRECTION FINDING OR COURSE INDICATING SYSTEMS
Filed Jan. 29, 1938
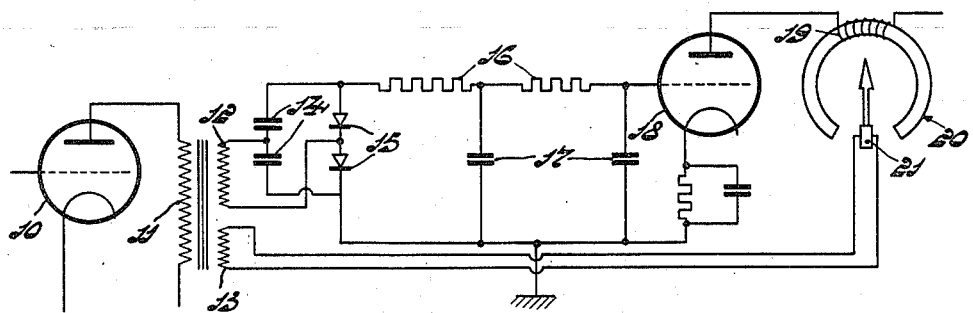
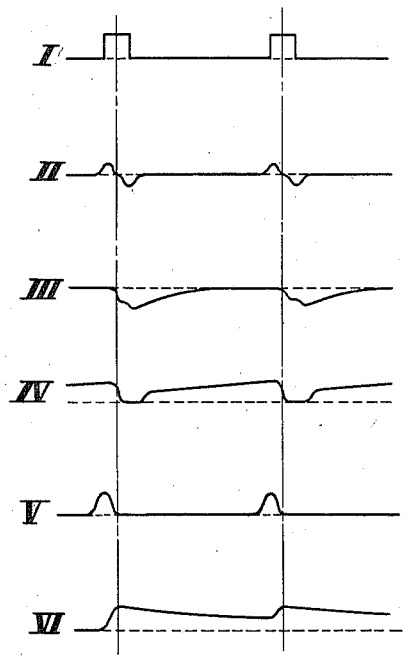
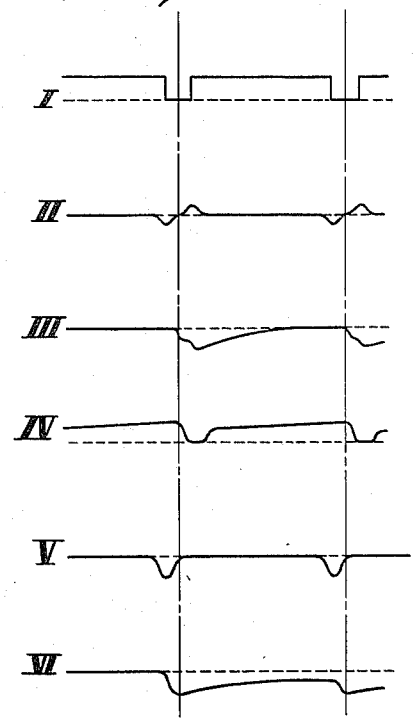
Inventor
Christopher E. G. Bailey
by [signature] Attorney Patented Feb. 3, 1942

2,271,534

UNITED STATES PATENT OFFICE 2,271,534

RADIO RECEIVER FOR DIRECTION FINDING OR COURSE INDICATING SYSTEMS

Christopher Edmund Gervase Bailey, Mitcham Junction, England, assignor to Radio Corporation of America, New York, N. Y.

Application January 29, 1938, Serial No. 187,635
In Great Britain February 11, 1937

4 Claims. (Cl. 250—11)

This invention relates to receivers for use in the reception of direction-finding or course-indicating signals from a radio transmitter which gives different periodic signals on opposite sides of a line of direction or course. A well-known system of this character is the aircraft landing system in which dot signals are given on one side and dash signals are given on the opposite side of the course, such signals merging to give a continuous note when the aircraft is on its correct course.

As is well-known, it is desirable to equip the receiver with means whereby a visible signal is given and for this purpose receivers have been fitted with two-way visual indicators, i. e. indicators adapted to give indications in either of two different senses such as meters of the central-zero type. Many of these prior arrangements suffer from the defect that the meter needle flickers during reception, thus confusing the operator. The object of the invention is to provide an improved arrangement which avoids this defect while at the time obviating the faults of some of the previous proposals for the same purpose.

According to one feature of the invention provision is made in a receiver of the kind in question of a right-left visual indicator which is responsive to the signals being received and of electrical control means for said indicator which is responsive to or controlled by the signals and which prevents the indication from changing in sense during the period of one cycle of a received signal.

In accordance with another embodiment of the invention wherein the invention is made applicable to a receiver for dot and dash signals I provide a right-left visual indicator which comprises a field winding fed with a current controlled in accordance with the derived pulses set up in the receiver by the signals and also a moving coil which co-operates with the field winding and is fed with a current also controlled in accordance with the said derived pulses, the said currents being so related (both in time and magnitude) that the sense of indication is made dependent on the sign of the first of each pair of derived pulses.

In this latter case I preferably feed the field winding of the indicator with current from the anode circuit of an amplifier whose bias is unidirectionally controlled in magnitude via a delay network from a rectifier circuit to which the received pulses are applied, whereas the moving coil has the derived pulses from the rectifier fed directly to it.

In order that the invention may be more readily understood one embodiment incorporating the arrangement referred to in the preceding paragraph will now be described by way of example with reference to the accompanying drawing wherein:

Fig. 1 is a circuit diagram of part of a receiver according to the invention, and Figs. 2 and 3 are wave-form diagrams.

Referring to Fig. 1, 10 indicates a triode rectifier which may be the output valve of a normal course-indicating receiver or a rectifier provided in addition to the normal output stage. The anode circuit of this valve includes the primary winding 11 of a transformer having two secondary windings 12 and 13. Winding 12 is connected to a rectifying arrangement comprising two condensers 14 and two rectifiers 15 connected in series, one end of the winding being connected to the junction point of the two condensers and the other end to the junction point of the two rectifiers. The rectifiers are so poled that, whatever the nature of the voltage pulses in the winding 12, the rectified current flowing in the rectifier combination upon receipt of pulses makes the upper end of the rectifier circuit more negative. Thus a negative voltage pulse is set up regardless of the polarity of each of the derived pulses. This negative pulse is applied through a delay network comprising series impedances 16 and shunt condensers 17 to the grid of a triode 18. The anode circuit of the triode 18 includes the winding 19 of an electromagnet forming part of a meter, designated by the general reference 20, of the central-zero type. This meter includes a moving coil 21 which is directly connected to the transformer winding 13.

The operation of this circuit will now be described with reference to Figs. 2 and 3 which illustrate the conditions arising when dots and dashes respectively are being received. In each figure the uppermost diagram I represents the output from valve 10, curve II the derived pulses which are induced in the secondaries 12 and 13 and which are impressed on the moving coil 21 and the rectifying circuit 14, 15, curve III the bias on the grid of valve 18 due to the action of rectifiers 15, curve IV the anode current of valve 18, curve V the torque on the moving coil 21 and curve VI the resultant deflection of the pointer connected to the moving coil 21. In all cases the horizontal axes represent time.

Referring to curves II, it will be seen that a pair of pulses is set up in the transformer windings 12 and 13 on the occurrence of each dot or completion of each dash, these pulses being opposite in their signs according as to whether dots or dashes are received. Notwithstanding this variation of sign the rectifier system 14, 15 always produces a pulse of negative bias as shown in curves III, the anode current of triode 18 and hence the field current of meter 20 varying synchronously with the bias as shown in curves IV. Assume that upon the arrival of a dot the first derived pulse shown to the left of the vertical line in curve II causes the meter pointer to deflect to the left (the left being shown as an upward deflection in Fig. 2). Before the completion of the dot the anode current of valve 18 (see curve IV), and hence the field current in winding 19 of meter 20, is reduced or suppressed by the delayed biasing impulse III from the rectifying circuit 14, 15 and thus in the absence of field current in the meter there is little tendency for the meter to decrease its deflection when the current in coil 21 reverses its direction as shown by the second half of the pulse to the right of the vertical line in curve II. Before the arrival of the next dot, however, the anode current of valve 18 is restored.

In a meter of this type the deflecting torque is proportional to the product of the field current and the energizing current which is applied to coil 21. The field current has a uniform direction, and thus the direction of the pointer deflection may be reversed by reversing the direction of the current through coil 21. As shown in curve V of Fig. 2, therefore, a counterclockwise torque is exerted from the beginning of the positive impulses of curve II until the field current of curve IV become zero. The field current is not immediately restored, and therefore no clockwise torque is exerted by the negative half of the impulse of curve II. Since all successive impulses are now exerted in the same direction, and since the meter is highly damped, the meter deflection is as shown in curve VI.

If the receiver is in a region in which the dash signals are preponderant upon the completion of a dash the meter will deflect to the right (downwards in Fig. 3) due to the negative derived pulse in curve II of Fig. 3, and since its field current will be suppressed or reduced before the arrival of the next dash there will in this case also be little tendency for the meter to decrease its deflection. The result is that the sign of the average torque over a signal cycle is dependent on the sign of the first of the pair of oppositely-sensed derived pulses shown in curves II, and is thus dependent upon whether dot or dash signals are predominant. Continuous reading course indication is thus provided.

It is obviously preferable that the meter should be of the dead-beat type with a long time constant. This characteristic may be produced by any known means such as by the provision of air or liquid damping or of an eddy current brake co-operating with an auxiliary permanent magnet.

What I claim is:

1. In a receiver for use in the reception of course-indicating signals which are characterized by having different periodic signals on opposite sides of said course, the combination which includes means responsive to said periodic signals for indicating a preponderance of one of said signals, said means comprising a meter having a field winding and a moving coil, means for deriving unipotential pulses having a predetermined time relation to said periodic signals, and means for applying said pulses to said field winding for controlling the sensitivity of said indicator.

2. In a receiver for use in the reception of course-indicating signals which are characterized by having different periodic signals on opposite sides of said course, the combination which includes means responsive to said periodic signals, means for indicating a preponderance of one of said signals comprising a meter having a field winding and a moving coil, means for energizing said moving coil by groups of pulses derived from said signals, and means operable upon said field winding for reducing the sensitivity of said meter after the first pulse of each of said groups has been impressed on said meter.

3. In a receiver for use in the reception of course-indicating signals which are characterized by having different periodic signals on opposite sides of said course, the combination which includes a meter for indicating which of said different periodic signals have the greatest intensity at any instant, said meter comprising a field coil and a moving coil which operates a pointer, means for impressing on said moving coil groups of successive pulses of opposite polarity which are derived from said characteristic signals, means for obtaining a biasing potential from said signals, and means for controlling the sensitivity of said meter by said biasing potential so that said meter responds to pulses of the polarity of the first pulse of said groups.

4. A device of the character described in claim 3 in which said means for controlling the sensitivity of said meter includes a thermionic tube to which said biasing potential is applied.

CHRISTOPHER EDMUND GERVASE BAILEY.